Patented Oct. 25, 1932

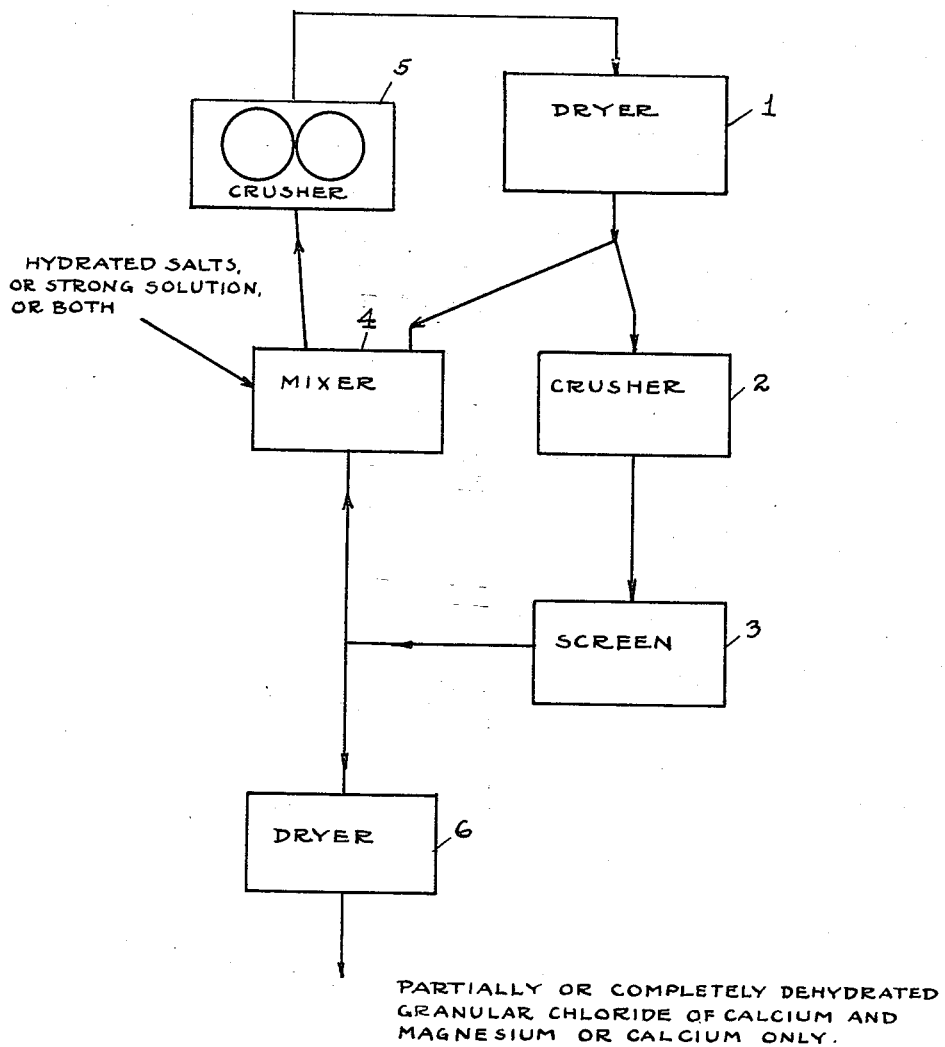

1,884,522

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

CALCIUM-MAGNESIUM-CHLORIDE PRODUCT AND METHOD OF MAKING SAME

Application filed March 3, 1928. Serial No. 258,764.

In the utilization of natural brines, such as are found for example in the so-called Midland field or Saginaw Valley district of Michigan, the principal commercial products extracted from such brine, in addition to the bromine where the latter is present in sufficient amount to warrant its recovery, are the chlorides of sodium, calcium and magnesium. The separation of sodium chloride or common salt has long been practiced according to well known methods not only in the treatment of the brines from the aforesaid district, but elsewhere, and does not call for special comment. Where, however, as in the case of brines of the type referred to, the chlorides of calcium and magnesium are also present, their separation and conversion into forms suitable for use in commerce and industry presents a special problem.

A large market has been developed for hydrated calcium chloride, $CaCl_2.2H_2O$, in the form of a free pouring, non-caking, granular or flaked product made in accordance with U. S. Patent 1,527,121 to P. Cottringer and W. R. Collings, dated Feb. 17, 1925, and there has likewise been developed a market for hydrated magnesium chloride, $MgCl.6H_2O$, also in the form of a free-pouring, practically non-caking, granular or flaked product, and processes particularly designed for the separation of such calcium and magnesium chlorides, where found present in solution together, are disclosed and claimed in U. S. Patent No. 1,627,068 to A. K. Smith and C. F. Prutton, dated May 3, 1927.

It may be noted in passing that such hydrated magnesium chloride forms, of course, the basis for making the anhydrous salt which has a separate field of use. However, the common property of the above hydrated or partially hydrated chlorides of calcium and magnesium, which may reasonably form the basis of a large demand, is their hygroscopic character; indeed the present large output of calcium chloride is chiefly consumed in dust laying and cement concrete curing wherein this property is advantageously utilized.

Heretofore no cheap and easily operated method has been available for the manufacture of mixed calcium and magnesium chlorides in granular, free flowing, non-caking form directly from brine or mother liquors, although the value and convenience of such a product for use as a dust layer and for other purposes has long been realized.

Comparatively small quantities of these mixed chlorides have been manufactured and sold in solid form for the preparation of brine for refrigeration uses. Some granular material has been made by crushing the solid, but this method is expensive and the product so obtained is subject to caking when stored. Manufacturing methods ordinarily employed in producing flaked, pure calcium chloride or magnesium chloride do not work well when applied to a mixture of calcium and magnesium chlorides.

We have discovered a method whereby mixed calcium and magnesium chlorides may be prepared in granular, free pouring, non-caking form easily and cheaply, thus furnishing a product eminently suited for a dust layer for use on gravel roads and the like and for some other uses for which calcium chloride is ordinarily used.

However, while our process is particularly applicable to the production of mixed chlorides of calcium and magnesium, it is to be distinctly understood that it is equally applicable to the production of a pure calcium chloride, as for instance, by mixing partially dehydrated $CaCl_2$ $2H_2O$ with normal $CaCl_2$ $2H_2O$, or with a solution of calcium chloride or with strong mother liquor thereof or with both mother liquor and crystals, as for example, a slurry thereof, parting off a portion of the dried material and recycling the balance through the mixing and drying steps.

To the accomplishment of the foregoing and related ends, the invention, then, consists of the steps and product hereinafter fully described and particularly pointed out in the claims, the annexed drawing and the following description setting forth in detail several approved modes of carrying out the process and various modifications in the composition of the product, such disclosed mode and constitution, however, representing but several of the various ways in which the principle of the invention may be used.

In said annexed drawing:—

The sole figure is a diagrammatic illustration on the order of a flow sheet showing in proper sequence the principal steps involved in carrying out one form of our improved method or process.

The feasibility and success of our process depends upon the discovery that the mixed hydrated chlorides of calcium and magnesium when dried down to a low water content will, when mixed with a strong solution of mixed calcium and magnesium chlorides in a mixer, form a dry hydrated product in the form of granules or lumps which may be again dried down to a low water content without fusing or forming a sticky mass in the drying operation. A portion of the dried product thus obtained may be removed and the remainder remixed with additional calcium-magnesium chloride liquor as described above and the drying then repeated. We have thus a cyclic process, calcium-magnesium chloride liquor being added at one point and mixed chlorides of low water content being removed at another, and a portion of the material being recycled in the process.

The mixed chlorides removed from the cycle can be further dried to give the final product if desired.

More solution than that required to give an absolutely dry mixture can be added to the dried cycled portion of the material in the mixer if desired, provided not enough is added to make the solution too gummy or give a mixture which will fuse or become too sticky in the dryer at the drying temperature used. A gummy sticky mixture tends to ball up and otherwise exhibit troublesome characteristics while drying.

Instead of the strong solution of calcium and magnesium chloride above described as added to the dried recycled material we may, if desired, use a mixture of mixed chloride solution and crystals containing calcium and magnesium chlorides such as a slurry of crystals and mother liquor obtained by concentrating a mixed chloride solution in an evaporator, or we may even use crystals alone containing calcium and magnesium chlorides such as, for instance, tachydrite crystals, $2MgCl_2 \cdot CaCl_2 \cdot 12H_2O$ having a higher water content than the dried material with which it is mixed.

Referring now to the apparatus diagrammatically indicated in the drawing, a stream of mixed, partially dehydrated salt or salts and added solution or salts higher in water content is dried in a suitable drier 1. The latter will preferably be either a rotary kiln or shelf type drier through which a current of heated air is passed. A portion of such dried material may be deflected to the crusher 2, for reducing to desirable size of particles and may then be separated in a suitable screen 3, the fines being returned to a mixer 4, into which the balance of the material dried in drier 1 is mixed with the incoming raw material, i. e., hydrated salts or strong solution, or both. The mixture therein produced is then fed to the drier, preferably through a crusher 5, to reduce large lumps for effective contact with the current of drying air or other heat source in the dryer. It will be seen therefore that a portion of the salts in process are cycled through the drier 1, mixer 4 and crusher 5, new material entering at the mixer and an equivalent amount of intermediate product passing out through the crusher 2 and screen 3. A second drier 6, may be used to further dry or condition the crushed and screened product which will be a partially or completely dehydrated, granular, mixed chloride of calcium and magnesium or a similar chloride of calcium only.

The crusher 2 may be combined as to its functions with the mixer 4, if desired. Other variations in procedure may be practiced. For instance, the recycled material from the drier 1 may be crushed and then fed to the drier and the fresh material added therein, the effect being the same and such alternative practice being permissible without departing from the spirit of the invention.

The process may be operated to turn out a final product of any desired screen analysis and of any desired dryness. It is obvious that irrespective of the character of the raw material entering the system, whether a hydrated single salt, a hydrated double salt, or a mixture of hydrated salts, or mother liquor containing only calcium chloride or a mixture of calcium and magnesium chlorides, and further irrespective of the proportions in which such chlorides may enter the system it will be perfectly feasible to standardize the anhydrous chloride content of this product at any desirable point, as for instance, 80% by controlling the extent of the dehydration in the driers and particularly in the final drier 6.

However, the drier 6 may be omitted if desired and the same results as to water content and other properties of the finished product be obtained by suitable control of the extent of drying in the principal drier which may be operated to at all times produce both for re-run and for final product the desired degree of dehydration.

The disclosure above has set forth the operation of the process when once in swing, and it has been pointed out that a wide variety of raw materials may be used. In order to start the process an equally wide variety of materials may be used.

Our process, for example, may start with a hygroscopic salt of magnesium or calcium or a mixture of the two. For example, such salt may be crushed or flaked chloride, single, double or mixed, or tachydrite crystals $2MgCl_2.CaCl_2.12H_2O$, or the double compound, $MgCl_2 2CaCl_2.6H_2O$, or crystals of calcium chloride di-hydrate, $CaCl_2.2H_2O$, or of the various hydrated forms of magnesium chloride, $MgCl_2.6H_2O$, $MgCl_2.4H_2O$, etc., or mixtures of any or all of these, or other forms of chlorides of these metals. Such material may be used initially and the process continued by recycling a portion of the dried mixtures as previously described.

The operation of the drier can be controlled by separate controls of the rates of feeding, of the temperature used, and of the rate of air flow therethrough, a rotary kiln type of drier being a feasible and practical form for use in this connection. The tonnage output will be controlled by the rate of feed of salt and the rate of addition of mother liquor, while the avoidance of melting and balling up in the drier can be controlled by appropriate regulation of the rate of addition of such mother liquor and of the working temperature. While a considerable temperature range is feasible, an efficient rate of treatment for a satisfactory throughput is had in general with a temperature of 300 degrees C. for the air entering the drier; and the rate of air flow should be controlled to prevent the material from getting sticky through overheating and aggregating into balls, while the drier tube itself should be long enough and the air flow sufficient to provide the proper drying combined with the proper rate of working. Furthermore, in some cases it will be necessary and in all advisable to after-cool the product before packing, such cooling being conveniently carried out in a rotary type of cooler with a current of atmospheric air of regulated amount.

It should be further explained that the process may be operated continuously as heretofore indicated, or it may be operated in batches if preferred, enough of the material being saved from each batch to start the succeeding batch, or the succeeding batch may be started afresh with raw material of the character heretofore described. We would point out further that, whereas a method is set forth in the aforesaid U. S. Patent No. 1,527,121, for superficially dehydrating hygroscopic salts for the purpose of reducing their tendency to cake together, we carry the dehydration to a point substantially beyond such superficial stage, increasing in fact the anhydrous salt content markedly. In other words, by our method we can feed in a mother liquor or equivalent hydrous form of the salt or salts and take out a standardized partially dehydrated granular product without material fusion of the mixture during any intermediate stage of drying. Furthermore, our mother liquor can be of variable composition and we may add to it crystals of chloride or mixed chlorides. We start with the hydrous salt or salts, either as a solution or hydrated crystals thereof, and in one connected process turn out a granular product not only partially dehydrated, but sufficiently dehydrated if desirable to standardize the anhydrous salt content at any suitable percentage so that no matter what the composition of the raw material or the ratio therein of magnesium chloride to calcium chloride, a standardized granular product may be secured.

Other modes of applying the principle of the invention may be employed, change being made as regards the details herein disclosed, provided the steps or products stated by any of the following claims, or the equivalent of such, be employed.

We therefore particularly point out and distinctly claim as our invention:—

1. The method of preparing a granular dehydrated form of a mixture of hygroscopic hydrated chlorides of calcium and magnesium which comprises intermixing a hydrous form of such chlorides with a body of a granular dehydrated form thereof in such proportion that the resultant mixture will not fuse at the subsequent drying temperature and then heating such mixture in a hot aeriform current to dehydrate the same, whereby a dry granular mixed product is made directly without material fusion thereof during the drying operation.

2. The method of preparing a granular dehydrated form of a mixture of hygroscopic hydrated chlorides of calcium and magnesium which comprises intermixing a hydrous form of such chlorides with a body of a granular dehydrated form thereof in such proportion that the resultant mixture will not fuse at the subsequent drying temperature, heating such mixture in a hot aeriform current to dehydrate the same and returning a portion of the dried product to the first step as the dehydrated component therein.

3. The method of preparing a granular dehydrated form of a mixture of hygroscopic hydrated chlorides of calcium and magnesium which comprises intermixing a crystalline hydrated form of the two chlorides with a body of a granular dehydrated form thereof in such proportion that the resultant mixture will not fuse at the subsequent drying temperature and then heating such mixture in a hot aeriform current to dehydrate the same, whereby a dry granular mixed product is made directly without material fusion thereof during the drying operation.

4. The method of preparing a granular dehydrated form of a mixture of hygroscopic hydrated chlorides of calcium and magnesium which comprises intermixing a crystalline hydrated form of the two chlorides with a body of a granular dehydrated form thereof in such proportion that the resultant mixture will not fuse at the subsequent drying temperature, heating such mixture in a hot aeriform current to dehydrate the same and returning a portion of the dried product to the first step as the dehydrated component therein.

Signed by us, this 17th day of February, 1928.

EDWIN O. BARSTOW.
SHELDON B. HEATH.